US012351429B2

(12) United States Patent
Perunka et al.

(10) Patent No.: US 12,351,429 B2
(45) Date of Patent: Jul. 8, 2025

(54) ELEVATOR CALL ALLOCATION IN AN ELEVATOR SYSTEM

(71) Applicant: KONE Corporation, Helsinki (FI)

(72) Inventors: Pekka Perunka, Helsinki (FI); Mikko Puranen, Helsinki (FI); Janne Öfversten, Helsinki (FI); Tapio Tyni, Helsinki (FI); Jari Romo, Helsinki (FI); Ville Thomenius, Helsinki (FI)

(73) Assignee: KONE CORPORATION, Helsinki (FI)

( * ) Notice: Subject to any disclaimer, the term of this patent is extended or adjusted under 35 U.S.C. 154(b) by 1548 days.

(21) Appl. No.: 16/789,964

(22) Filed: Feb. 13, 2020

(65) Prior Publication Data

US 2020/0283260 A1 Sep. 10, 2020

(30) Foreign Application Priority Data

Mar. 7, 2019 (EP) .................................... 19161333

(51) Int. Cl.
*B66B 1/30* (2006.01)
*B66B 1/34* (2006.01)
*B66B 1/46* (2006.01)

(52) U.S. Cl.
CPC ............ *B66B 1/302* (2013.01); *B66B 1/3415* (2013.01); *B66B 1/468* (2013.01); *B66B 2201/216* (2013.01); *B66B 2201/4607* (2013.01)

(58) Field of Classification Search
CPC .. B66B 1/302; B66B 1/06; B66B 1/28; B66B 3/002; B66B 1/468; B66B 5/0018; B66B 5/021; B66B 1/2408; B66B 5/0025; B66B 2201/216; B66B 1/3415; B66B 2201/4607
See application file for complete search history.

(56) References Cited

U.S. PATENT DOCUMENTS

2014/0167657 A1* 6/2014 Nishikawa .............. B60L 58/15 320/134
2018/0093854 A1* 4/2018 Thebeau ................. B66B 5/024
2020/0283260 A1* 9/2020 Perunka ................ B66B 1/2408

FOREIGN PATENT DOCUMENTS

| | | | | | |
|---|---|---|---|---|---|
| CN | 107785627 | A | * | 3/2018 | B66B 1/34 |
| CN | 108689260 | A | | 10/2018 | |
| EP | 1 354 837 | A1 | | 10/2003 | |
| EP | 2323940 | B1 | * | 7/2016 | B66B 1/2458 |
| EP | 3705434 | A1 | * | 9/2020 | B66B 1/18 |
| EP | 3705436 | A1 | * | 9/2020 | B66B 1/28 |
| JP | WO2002057171 | A1 | * | 5/2004 | |
| JP | 2013-71804 | A | | 4/2013 | |
| JP | 2018177407 | A | * | 11/2018 | B66B 1/2408 |
| WO | WO-2013053648 | A1 | * | 4/2013 | B66B 1/2458 |
| WO | WO-2020100229 | A1 | * | 5/2020 | |

* cited by examiner

*Primary Examiner* — Jianchun Qin

(74) *Attorney, Agent, or Firm* — Birch, Stewart, Kolasch & Birch, LLP

(57) ABSTRACT

According to an aspect, there is provided a method for elevator call allocation in an elevator system. The method comprises receiving charge information associated with an energy storage of an elevator car from each of a plurality of elevator cars of the elevator system; receiving an elevator call to a floor providing a charging arrangement for the energy storages; and allocating the elevator call to an elevator car of the plurality of elevator cars at least partly based on the charge information received from each of the plurality of elevator cars.

14 Claims, 4 Drawing Sheets

ELEVATOR CALL ALLOCATION IN AN ELEVATOR SYSTEM

BACKGROUND

Travelling cable free elevator cars need to have an on-board energy storage for providing power to an elevator car. These energy storages have limited storage capacity and thus it is necessary to recharge them on intervals sufficient. Lack of charge in the energy storage system could at worst result in loss of power supply to the car electrification, which in the case of wirelessly operating elevator car could cause an emergency stop.

Further, on-board energy storages that utilize battery technology (for example, configurations of individual battery cells connected in series and parallel) have an inherent problem with imbalance between individual cell voltages due to the difference in cell resistance over the entire battery pack. This means that at some point the battery pack has to be balanced after the cell voltages have deviated too far from each other. A severe cell imbalance will reduce the utilizable capacity of the battery pack and in worst case lead to a risk of overcharging or discharging.

Therefore, there is a need for a solution that, during operation of an elevator system, would maintain the charge of the energy storages of elevator cars while still maintaining acceptable service level.

SUMMARY

According to at least some of the aspects, a solution is provided that prevents the on-board energy storages of elevator cars from causing negative impact on traffic handling performance in an elevator system because of a low charge level or cell imbalance in the energy storages. The disclosed solution allocates a received elevator call to an elevator car of a plurality of elevator cars at least partly based on charge information associated with an energy storage received from each of the plurality of elevator cars.

According to a first aspect, there is provided a method for elevator call allocation in an elevator system. The method comprises receiving charge information associated with an energy storage of an elevator car from each of a plurality of elevator cars of the elevator system; receiving an elevator call to a floor providing a charging arrangement for the energy storages; and allocating the elevator call to an elevator car of the plurality of elevator cars at least partly based on the charge information received from each of the plurality of elevator cars. A solution is provided that enables charging of the energy storage of the elevator car while still maintaining a sufficient service level in the elevator system. The disclosed solution also may prevent the on-board energy storages from causing negative impact on the traffic handling performance because of unintentionally low charge levels or cell imbalances in the energy storages. Additionally, the solution may also enable better performance for the energy storages in terms of efficiency, safety and lifetime because they may be operated within an optimal operating range.

In an embodiment, the charge information comprises a request to charge the energy storage.

In an embodiment, the charge information comprises a request to perform cell balancing of the energy storage.

In an embodiment, the charge information comprises at least one of a charge level and a cell imbalance of the energy storage of each of the elevator cars.

In an embodiment, the method further comprises determining that a charge level of an energy storage of an elevator car is below a first threshold level; determining that the received elevator call is associated with a landing floor having a charging arrangement to charge energy storages of elevator cars; and allocating the elevator call to the elevator car having the charge level below the first threshold level to enable charging of the elevator storage at the landing floor.

In an embodiment, the method further comprises determining that the charge level of an energy storage of an elevator car is below a second threshold level; taking the elevator car out of service; and controlling the elevator car to travel to a landing floor having a charging arrangement to charge the energy storage of the elevator car.

In an embodiment, the method further comprises determining that the cell imbalance of an energy storage of an elevator car exceeds a third threshold value; taking the elevator car out of service; and controlling the elevator car to travel to a landing floor having a charging arrangement to balance the energy storage of the elevator car.

According to a second aspect, there is provided an elevator group controller comprising means for receiving charge information associated with an energy storage of an elevator car from each of a plurality of elevator cars of the elevator system; means for receiving an elevator call to a floor providing a charging arrangement for the energy storages; and means for allocating the elevator call to an elevator car of the plurality of elevator cars at least partly based on the charge information received from each of the plurality of elevator cars.

In an embodiment, the charge information comprises a request to charge the energy storage.

In an embodiment, the charge information comprises a request to perform cell balancing of the energy storage.

In an embodiment, the charge information comprises at least one of a charge level and a cell imbalance of the energy storage of each of the elevator cars.

In an embodiment, the elevator group controller further comprises means for determining that a charge level of an energy storage of an elevator car is below a first threshold level; means for determining that the received elevator call is associated with a landing floor having a charging arrangement to charge energy storages of elevator cars; and means for allocating the elevator call to the elevator car having the charge level below the first threshold level to enable charging of the elevator storage at the landing floor.

In an embodiment, the elevator group controller further comprises means for determining that the charge level of an energy storage of an elevator car is below a second threshold level; means for taking the elevator car out of service; and means for controlling the elevator car to travel to a landing floor having a charging arrangement to charge the energy storage of the elevator car.

In an embodiment, the elevator group controller further comprises means for determining that the cell imbalance of an energy storage of an elevator car exceeds a third threshold value; means for taking the elevator car out of service; and controlling the elevator car to travel to a landing floor having a charging arrangement to balance the energy storage of the elevator car.

According to a third aspect, there is provided an elevator system comprising an elevator group controller of the second aspect.

In an embodiment, the elevator system comprises at least two elevator shafts, each of the at least two elevator shafts comprising a plurality of landings and at least one charging arrangement to charge the energy storages of elevator cars, wherein the charging arrangements of different elevator shafts are disposed at different floor levels.

According to a fourth aspect, there is provided a computer program comprising program code, which when executed by at least one processing unit, causes the at least one processing unit to perform the method of the first aspect.

According to a fifth aspect, there is provided a computer readable medium comprising program code, which when executed by at least one processor, causes the at least one processor to perform the method of any the first aspect.

According to a sixth aspect, there is provided an apparatus. The apparatus comprises a processor configured to receive charge information associated with an energy storage of an elevator car from each of a plurality of elevator cars of an elevator system; receive an elevator call to a floor providing a charging arrangement for the energy storages; and allocate the elevator call to an elevator car of the plurality of elevator cars at least partly based on the charge information received from each of the plurality of elevator cars.

The above discussed means may be implemented, for example, using at least one processor, at least one processor and at least one memory connected to the at least one processor, or at least one processor, at least one memory connected to the at least one processor and an input/output interface connected to the at least one processor.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

The following description illustrates a solution that prevents on-board energy storages of elevator cars of an elevator system from causing negative impact on traffic handling performance in an elevator system because of a low charge level or cell imbalance in the energy storages. The disclosed solution may use, for example, charge state information associated with energy storages as a parameter when allocating an elevator call to an elevator car.

The state of an energy storage is characterized mainly by its charge level and cell imbalance. The term "charge level" used herein indicates the available charge at a particular moment relative to the total capacity of the energy storage. The term "cell imbalance" indicates the difference in charge levels between individual cells of the energy storage.

Figure 1A:
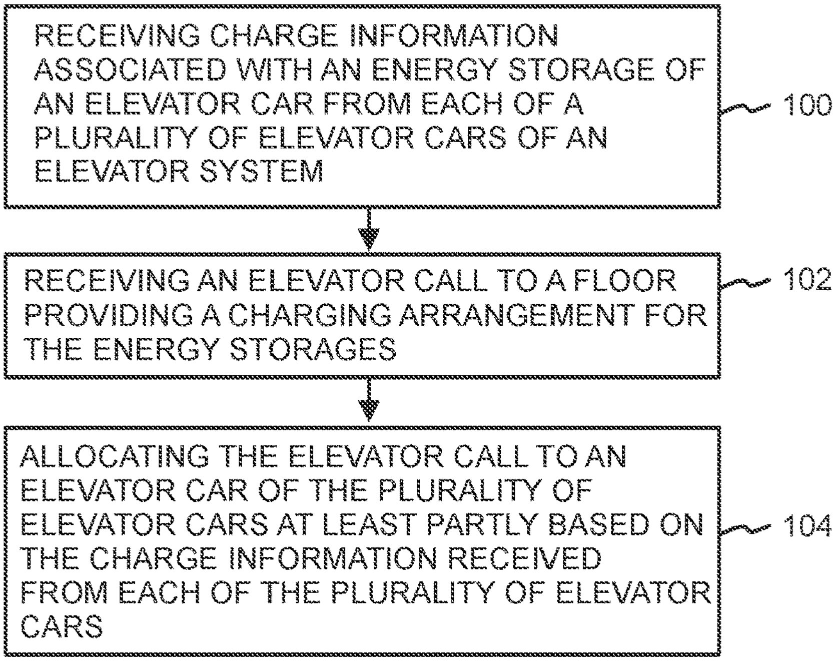
FIG. 1A illustrates a flow diagram of elevator call allocation according to an embodiment.

FIG. 1A illustrates a flow diagram of elevator call allocation according to an embodiment. The illustrated method may be performed, for example, by an elevator group controller of an elevator system. The method may be implemented as a computer-implemented method.

At 100 charge information associated with an energy storage of an elevator car is received from each of a plurality of elevator cars of the elevator system. Each elevator car comprises an energy storage that provides power for various equipment of the elevator car, for example, light, operating panels, etc. In some embodiments, the charge information comprises at least one of a charge level and a cell imbalance of the energy storage of each of the elevator cars. Each elevator may have an associated elevator controller, and the associated elevator controllers may be connected to an elevator group controller. In other embodiments, the charge information may comprise a request to charge the energy storage or a request to perform cell balancing of the energy storage.

At 102 an elevator call is received to a floor providing a charging arrangement for the energy storages. One or more floors in a building may be provided with the charging arrangement. The term "charging arrangement" means that, while elevator car is stationary at a specific floor, the energy storage of the elevator car can be charged, for example, by using a wireless or a wired charging solution. The elevator call may be caused by a passenger who a call by pushing an up/down button at a floor. Alternatively, the elevator call may be caused by a passenger giving a destination call and the serving elevator is immediately signaled for the passenger or passengers who gave the call.

At 104 the elevator call is allocated to an elevator car of the plurality of elevator cars at least partly based on the charge information received from each of the plurality of elevator cars. This provides a solution that enables charging of the energy storage of the elevator car while still maintaining a sufficient service level in the elevator system. The disclosed solution also may prevent the on-board energy storages from causing negative impact on the traffic handling performance because of unintentionally low charge levels or cell imbalances in the energy storages. Additionally, the solution also may enable better performance for the energy storages in terms of efficiency, safety and lifetime because they may be operated within an optimal operating range.

When the charge information comprises a request to charge the energy storage or a request to perform cell balancing of the energy storage, an energy storage system in an elevator car may have a battery management unit, which may be able to determine a cell balance and/or a state of charge. The energy storage system may then generate a cell balancing or a charging request for the elevator group controller, when needed. The elevator group controller then allocates a suitable call to the elevator to serve the request (or may take the elevator out of service to perform the cell balancing etc.).

Figure 1B:
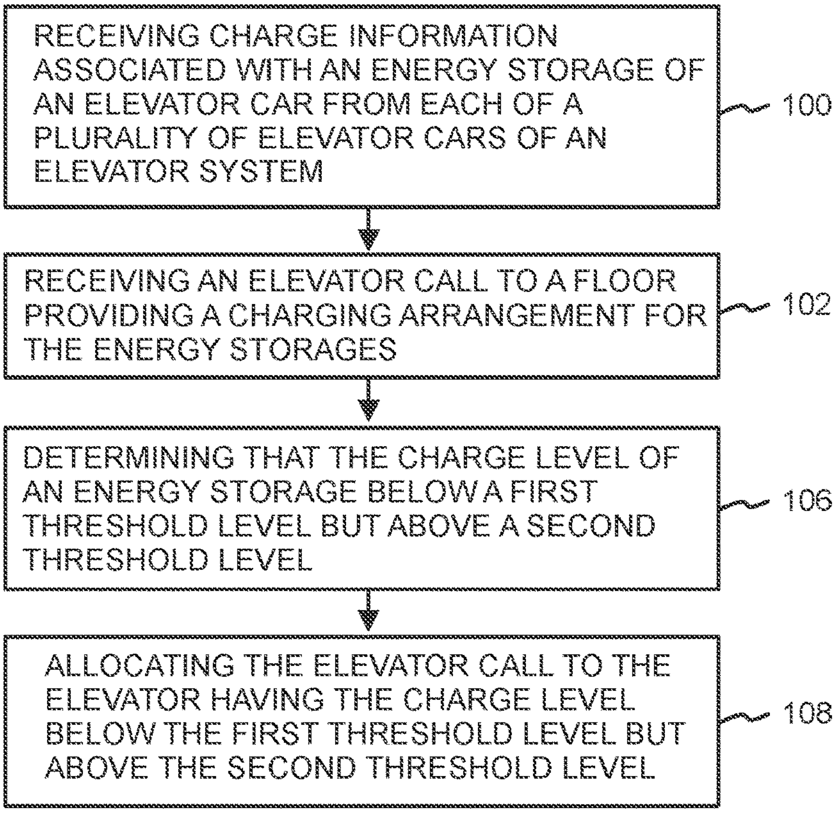
FIG. 1B illustrates a flow diagram of elevator call allocation according to another embodiment.

FIG. 1B illustrates a flow diagram of elevator call allocation according to an embodiment. The illustrated method may be performed, for example, by an elevator group controller of an elevator system. The method may be implemented as a computer-implemented method. The steps 100 and 102 have already been discussed in the description of FIG. 1A.

At 106 it is determined that the charge level of an energy storage is below a first threshold level but above a second threshold level. The first threshold level may refer to a lower value of an optimal operating range of the charge level. The first threshold value may be set, for example, to 50% of the full charge of the energy storage.

At 108 the elevator call is allocated to the elevator car having the charge level below the first threshold but above the second threshold in order to charge the energy storage of the elevator car.

Figure 1C:
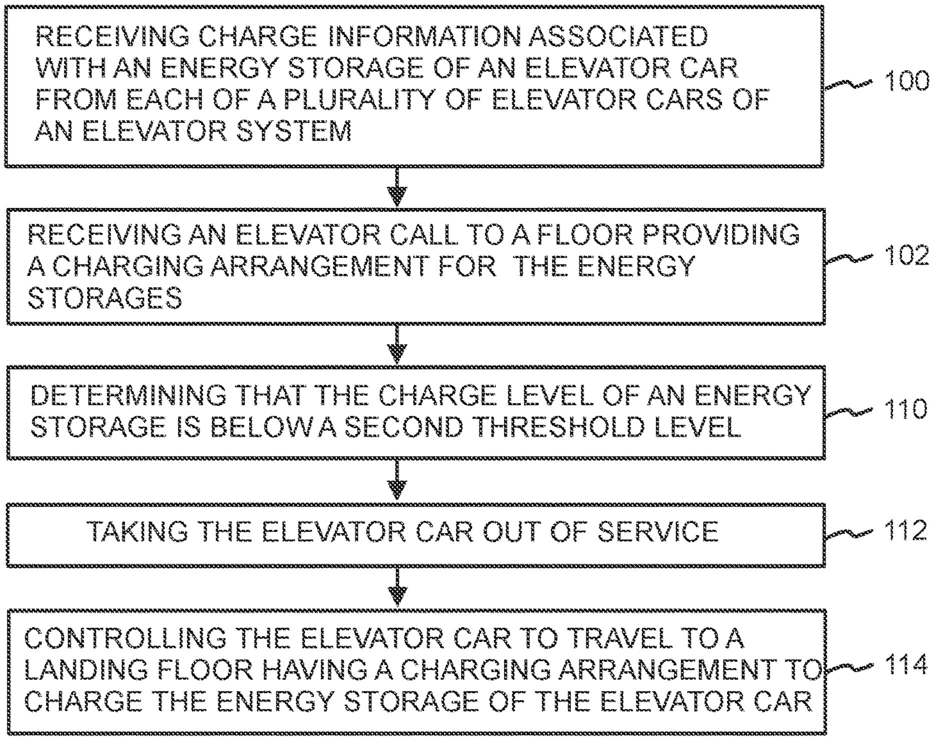
FIG. 1C illustrates a flow diagram of elevator call allocation according to another embodiment.

FIG. 1C illustrates a flow diagram of elevator call allocation according to an embodiment. The illustrated method may be performed, for example, by an elevator group controller of an elevator system. The method may be implemented as a computer-implemented method. The steps 100 and 102 have already been discussed in the description of FIG. 1A.

At 110 it is determined that the charge level of an energy storage of an elevator car is below a second threshold value. This may mean that the charge level of the energy storage is too low for an optimal operating range of the charge level. This means that it is considered that the charge level is too low in order to maintain adequate safety and performance characteristics.

At 112 the elevator car is taken out of service.

At 114 the elevator car is controlled to travel to a landing floor having a charging arrangement to charge the energy storage of the elevator car. This ensures that the elevator car will regain a sufficient charge level for its energy storage.

Figure 1D:
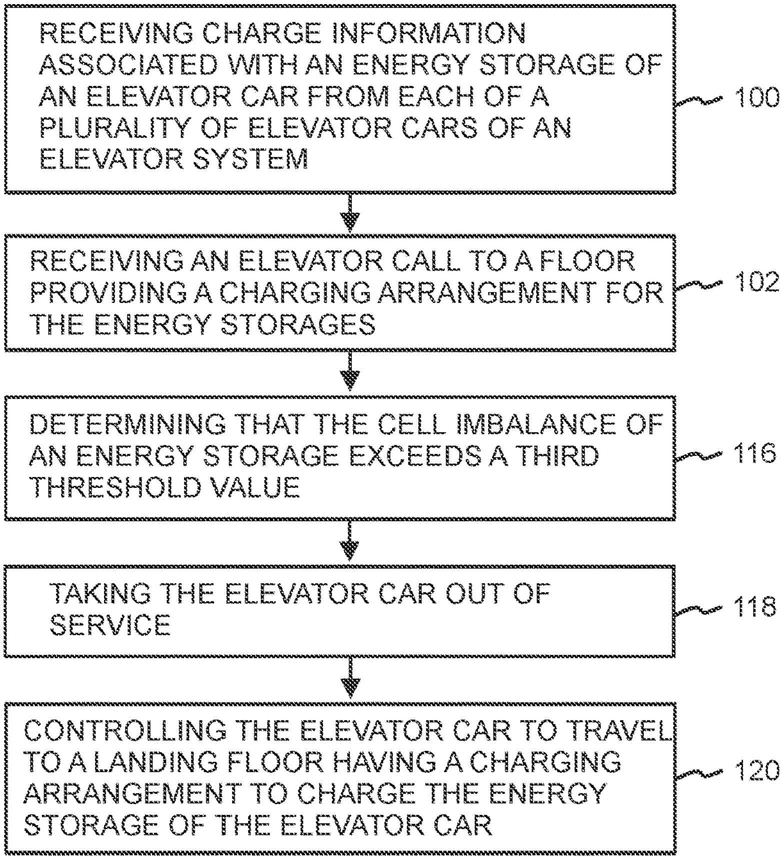
FIG. 1D illustrates a flow diagram of elevator call allocation according to another embodiment.

FIG. 1D illustrates a flow diagram of elevator call allocation according to an embodiment. The illustrated method may be performed, for example, by an elevator group controller of an elevator system. The method may be implemented as a computer-implemented method. The steps 100 and 102 have already been discussed in the description of FIG. 1A.

At 116 it is determined that the cell imbalance of an energy storage exceeds a third threshold value. When cells of the energy storage are rebalanced, they can also be charged to full 100% charge level. Severe cell imbalance may reduce the utilizable capacity of the energy storage and in worst case lead to a risk of overcharging or discharging. Thus, it is important to carry out the cell balancing on intervals that are sufficient at keeping the cells in balance. In some embodiments, the cell balancing may be performed, for example, once a day.

At 118 the elevator car is taken out of service.

At 120 the elevator car is controlled to travel to a landing floor having a charging arrangement to charge the energy storage of the elevator car. This ensures that the elevator car will regain a sufficient charge level for its energy storage.

Figure 2:
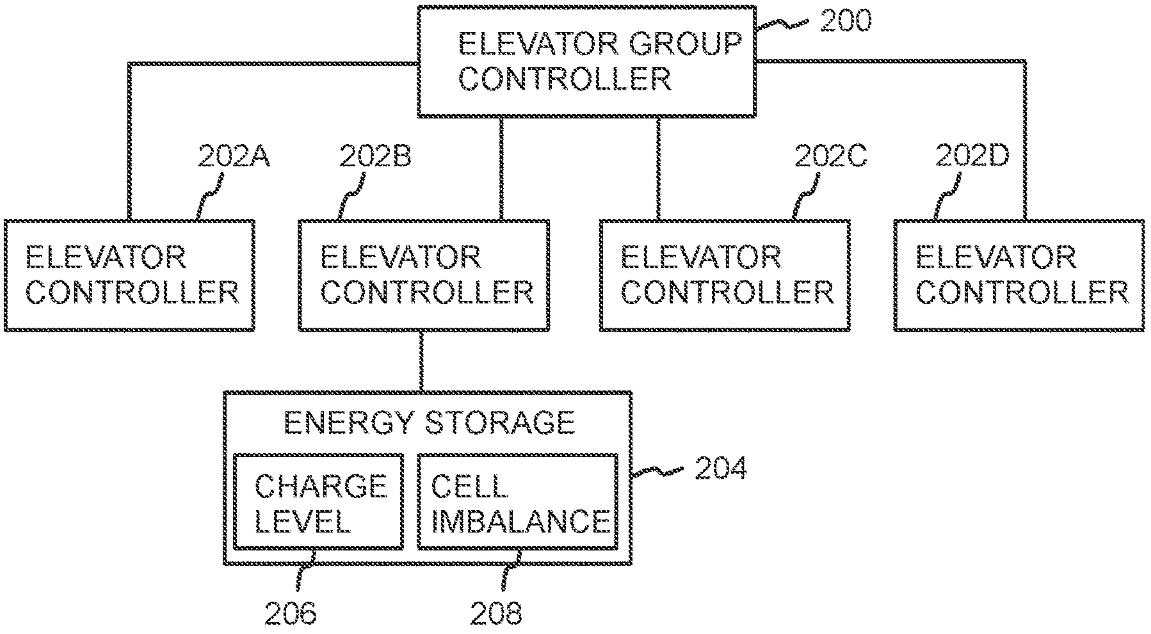
FIG. 2 illustrates a block diagram of an elevator system according to an embodiment.

FIG. 2 illustrates a block diagram of an elevator system 200 according to an embodiment. The elevator system 200 of FIG. 2 may be configured to implement the method discussed in relation to any of FIG. 1A, 1B, 1C or 1D.

The elevator group controller 200 may control a plurality of elevator controllers 202A, 202B, 202C, 202D. Each of the elevator controllers 202A, 202B, 202C, 202D may control its associated elevator car. Each elevator car comprises an energy storage 204 providing power for various equipment of the elevator car, for example, light, operating panels, etc. The energy storage 204 has two characteristics that reflect its operating capacity, a charge level 206 and a cell imbalance 208. The charge level 206 indicates the available charge at a particular moment relative to the total capacity of the energy storage 206. The cell imbalance 208 indicates the difference in voltage levels between individual cells of the energy storage 204. The elevator group controller 200 may periodically receive status updates of the energy storage 204 from the elevator controllers 202B or directly from the energy storage 204. In some embodiments, the elevator group controller 200 may receive a request from the energy storage 204 to charge the energy storage 204.

On-board energy storages that utilize battery technology (for example, configurations of individual battery cells connected in series and parallel) have an inherent problem with imbalance between individual cell voltages due to the difference in cell resistance over the entire battery pack. This means that at some point the battery pack has to be balanced after the cell voltages have deviated too far from each other. A severe cell imbalance will reduce the utilizable capacity of the battery pack and in worst case lead to a risk of overcharging or discharging.

One or more of the floors in a building may be provided with charging arrangements to charge the energy storages of the elevator cars. An elevator shaft may comprise a primary part of the charging arrangement and the elevator car may comprise a secondary part of the charging arrangement. The charging may be implemented, for example, as wireless charging or as a contact-based solution while an elevator car is stationary at a floor provided with the charging arrangement.

The elevator group controller 200 receives an elevator call to a floor providing a charging arrangement for the energy storages. The elevator group controller 200 allocates the elevator call to an elevator car of the plurality of elevator cars at least partly based on the charge information received from each of the plurality of elevator cars.

In some embodiments, the elevator group controller 200 determines that a charge level 206 of the energy storage 204 is below a first threshold level. The first threshold level may be set to any level that still maintains operation of the elevator car for a predetermined period of time. As an example, the first threshold level may be set to 55% of the full charge of the energy storage 204. When the elevator group controller 200 determines that a received elevator call is associated with a landing floor having a charging arrangement to charge energy storages of elevator cars, the elevator group controller 200 may allocate the elevator call to the elevator car having the charge level below the first threshold level to enable charging of the elevator storage at the landing floor.

In some embodiments, the elevator group controller 200 determines that the charge level of the energy storage 204 is below a second threshold level. Normally, the second threshold level is smaller than the first threshold level. As an example, while the first threshold level may be set to 55%, the second threshold level may be set to 50% of the full charge of the energy storage 204. If the charge level of the energy storage 204 is below the second threshold level, the elevator group controller 200 may take the elevator car out of service and control the elevator car to travel to a landing floor having a charging arrangement to charge the energy storage 204.

Some battery technologies (for example, lithium-ion batteries) may have better safety, performance and lifetime characteristics when operated within an optimal operating range of the charge level. As an example, the optimal operating range may be set to 50%-70%. By keeping the charge level of the energy storage 204 between the optimal operating range, this enables better performance for the energy storage system in terms of efficiency, safety and lifetime.

In some embodiments, the elevator group controller 200 determines that the cell imbalance 208 of the energy storage 204 exceeds a third threshold value. The cell imbalance 208 may reduce the utilizable capacity of the energy storage 204 and in worst case may lead to a risk of overcharging or discharging. Thus, in some embodiments, when the cell imbalance 208 of the energy storage 204 exceeds the third threshold value, the elevator group controller 200 may take the elevator car out of service and control the elevator car to travel to a landing floor having a charging arrangement to balance the energy storage 204.

Further, when allocating the elevator call to an elevator car, the elevator group controller 200 may also take into account that the charging of the energy storage 204 may be constrained by the available output power from the charging arrangement and the capability of the energy storage 204 to receive this power. For example, in cell balancing the currents may be very small and balancing a heavy imbalanced pack may take a long time.

Under real-world building traffic conditions, it may be that the charging opportunities are not evenly distributed among the elevator cars in an elevator group, but instead some of the on-board energy storages will be at lower charge level than others. The variation in the charge level within the elevator group can be caused, for example, by an uneven number of stops at a charging floor or floors, uneven stop times at the charging floors or uneven power consumption between different elevator cars. The elevator group controller 200 may be configured to control the charging of the energy storages of the elevator cars to minimize the need to take an elevator out of service.

Figure 3:
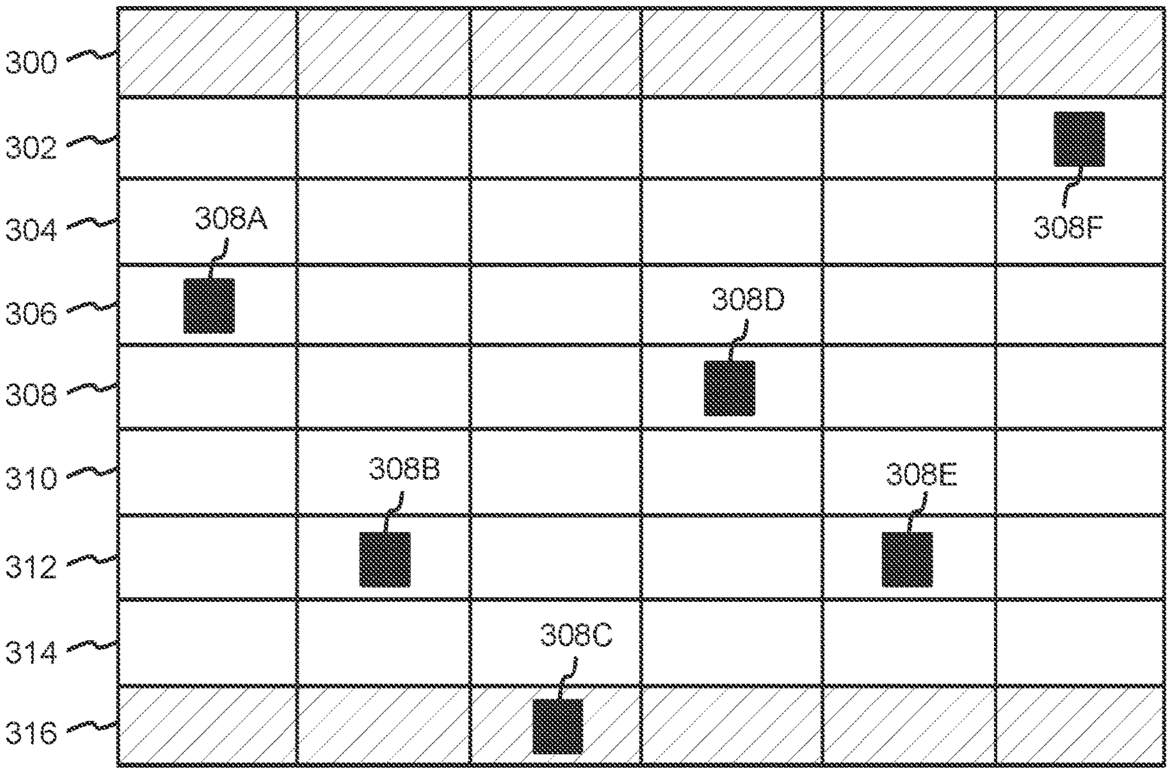
FIG. 3 illustrates charging arrangements in an elevator system according to an embodiment.

FIG. 3 illustrates charging arrangements in an elevator system according to an embodiment. The example illustrated in FIG. 3 depicts a building that has nine floors 300-316 and six elevator shafts. Each floor 300-316 is serviced by six elevators 308A-308F. Two of the floors 300, 316 are equipped with a charging arrangement. In other words, when an elevator stops at one of the floors 300, 316, it may charge its energy storage there. Although FIG. 3 illustrates an example where all the elevator shafts share the same charging floors 300, 316, in other embodiments, the number of charging floors may vary between different elevator shafts. Further, although FIG. 3 illustrates an example having nine floors, in other embodiments, the number of floors may be less than nine floors or more than nine floors.

As illustrated by FIG. 3, the elevator system may comprise at least two elevator shafts, each of the at least two elevator shafts comprising a plurality of landings and at least one charging arrangement to charge the energy storages of elevator cars, wherein the charging arrangements of different elevator shafts are disposed at different floor levels. This increases allocation options, because trips with different destination floors can be allocated as energy storage charging trips.

Figure 4:
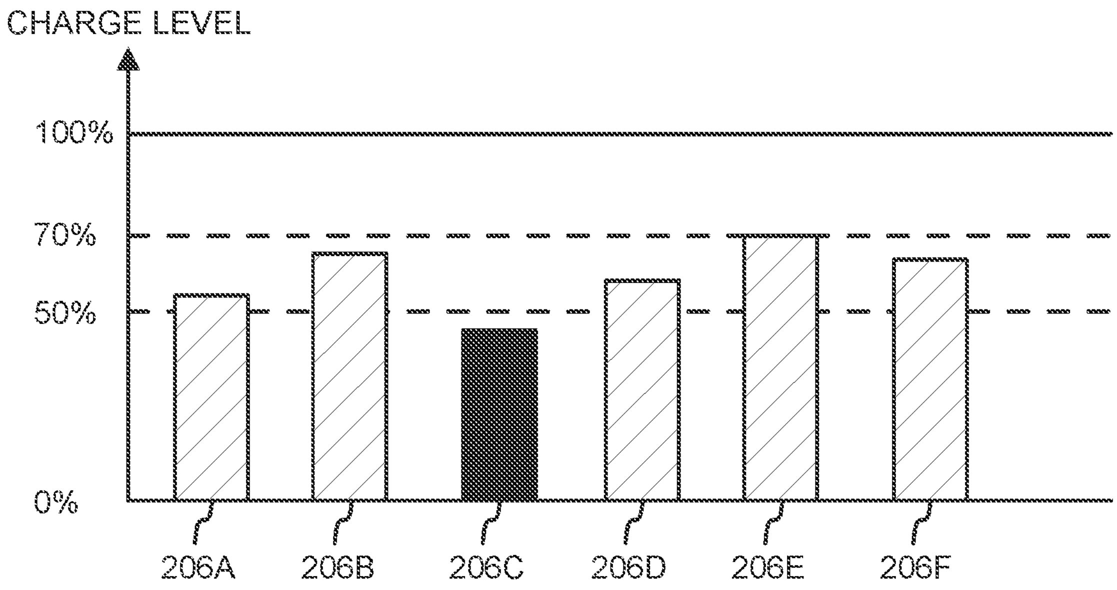
FIG. 4 illustrates a graph depicting charge levels of energy storages according to an embodiment.

FIG. 4 illustrates a graph depicting charge levels of energy storages according to an embodiment. In the example illustrated in FIG. 3, an optimal operating range of energy storages 206A-206F of elevator cars is considered to be 50%-70% of the full charge of the energy storages (i.e. 50% as a lower threshold and 70% as a higher threshold). As can be seen from FIG. 3, the charge levels 206A, 206B, 2069, 206E, 206F are within the set optimal operating range. The charge level 206C, however, is below a set lower threshold level. In one embodiment, due to this, an elevator call to a floor providing a charging arrangement may be allocated to the elevator car comprising the energy storage whose charge level below the set lower threshold. In another embodiment, the elevator car comprising the energy storage whose charge level below the set lower threshold may be taken out of service and controlled to travel to a landing floor having the charging arrangement to charge the energy storage.

In some embodiments, the number of threshold levels may be one or more than two. In an embodiment, the elevator group controller may emphasize allocations, where the elevators serve calls associated with charging floors, differently based the charge levels of the energy storages.

Figure 5:
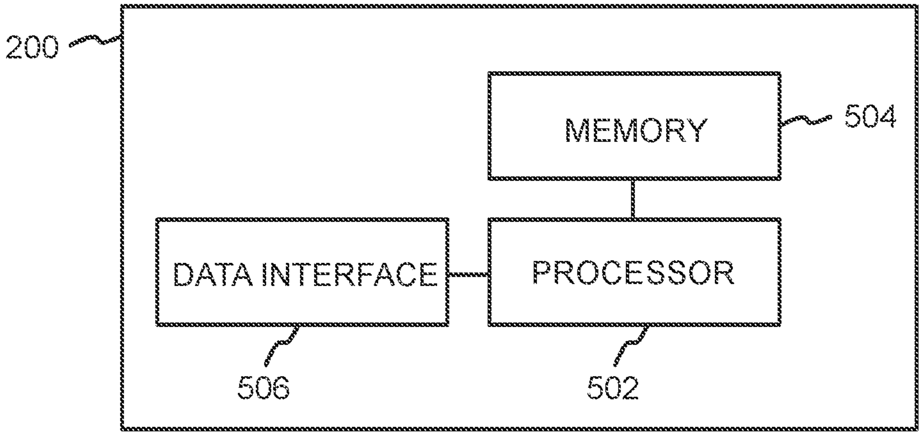
FIG. 5 illustrates a block diagram of an elevator group controller according to an embodiment.

FIG. 5 illustrates a block diagram of an elevator group controller 200 according to an embodiment. The illustrated elevator group controller 200 can include a controller or processor 502 (e.g., signal processor, microprocessor, ASIC, or other control and processing logic circuitry) for performing such tasks as signal coding, data processing, input/output processing, power control, and/or other functions. The illustrated elevator group controller 200 can include a memory or memories 504. The memory 504 can include non-removable memory and/or removable memory. The non-removable memory can include RAM, ROM, flash memory, a hard disk, or other well-known memory storage technologies. The memory 304 may also be used for storing data and/or code for running one or more applications.

The elevator group controller 200 may further comprise a data interface 506 that enabling communication with external devices or networks. The data interface 506 may include a wired or wireless transceiver for communicating with the external devices or networks. The components of the elevator group controller 200 are exemplary, and the elevator group controller 200 may comprise also other components or elements.

The memory 504 may comprise a computer program that, when executed by the processor 502, causes the elevator group controller 200 to receive charge information associated with an energy storage of an elevator car from each of a plurality of elevator cars of the elevator system; receive an elevator call to a floor providing a charging arrangement for the energy storages; and allocate the elevator call to an elevator car of the plurality of elevator cars at least partly based on the charge information received from each of the plurality of elevator cars.

Further, any combination of the illustrated components disclosed in FIG. 5, for example, at least one of the processor 502, the memory 504 and the data interface 506 may constitute means for determining that a charge level of an energy storage of an elevator car is below a first threshold level; means for determining that the received elevator call is associated with a landing floor having a charging arrangement to charge energy storages of elevator cars; and means for allocating the elevator call to the elevator car having the charge level below the threshold level to enable charging of the elevator storage at the landing floor.

Example embodiments may be implemented in software, hardware, application logic or a combination of software, hardware and application logic. The example embodiments can store information relating to various methods described herein. This information can be stored in one or more memories, such as a hard disk, optical disk, magneto-optical disk, RAM, and the like. One or more databases can store the information used to implement the example embodiments. The databases can be organized using data structures (e.g., records, tables, arrays, fields, graphs, trees, lists, and the like) included in one or more memories or storage devices listed herein. The methods described with respect to the example embodiments can include appropriate data structures for storing data collected and/or generated by the methods of the devices and subsystems of the example embodiments in one or more databases.

All or a portion of the example embodiments can be conveniently implemented using one or more general purpose processors, microprocessors, digital signal processors, micro-controllers, and the like, programmed according to the teachings of the example embodiments, as will be appreciated by those skilled in the computer and/or software art(s). Appropriate software can be readily prepared by programmers of ordinary skill based on the teachings of the example embodiments, as will be appreciated by those skilled in the software art. In addition, the example embodiments can be implemented by the preparation of application-specific integrated circuits or by interconnecting an appropriate network of conventional component circuits, as will be appreciated by those skilled in the electrical art(s). Thus, the examples are not limited to any specific combination of hardware and/or software. Stored on any one or on a combination of computer readable media, the examples can include software for controlling the components of the example embodiments, for driving the components of the example embodiments, for enabling the components of the example embodiments to interact with a human user, and the like. Such computer readable media further can include a computer program for performing all or a portion (if processing is distributed) of the processing performed in implementing the example embodiments. Computer code devices of the examples may include any suitable interpretable or executable code mechanism, including but not limited to scripts, interpretable programs, dynamic link libraries (DLLs), Java classes and applets, complete executable programs, and the like. In the context of this document, a “computer-readable medium” may be any media or means that can contain, store, communicate, propagate or transport the instructions for use by or in connection with an instruction execution system, apparatus, or device, such as a computer. A computer-readable medium may include a computer-readable storage medium that may be any media or means that can contain or store the instructions for use by or in connection with an instruction execution system, apparatus, or device, such as a computer. A computer readable medium can include any suitable medium that participates in providing instructions to a processor for execution. Such a medium can take many forms, including but not limited to, non-volatile media, volatile media, transmission media, and the like.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure.

Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

The invention claimed is:

1. A method for elevator call allocation in an elevator system, the method comprising:

receiving charge information associated with an energy storage of an elevator car from each of a plurality of elevator cars of the elevator system;

receiving an elevator call to a floor providing a charging arrangement for the energy storages; and allocating the elevator call to an elevator car of the plurality of elevator cars at least partly based on the charge information received from each of the plurality of elevator cars, wherein the charge information comprises at least one of a charge level and a cell imbalance of the energy storage of each of the elevator cars, wherein the method further comprises:

determining that the charge level of an energy storage of an elevator car is below a second threshold level;

taking the elevator car out of service; and controlling the elevator car to travel to a landing floor having a charging arrangement to charge the energy storage of the elevator car.

2. The method of claim 1, wherein the charge information comprises a request to charge the energy storage.

3. The method of claim 1, wherein the charge information comprises a request to perform cell balancing of the energy storage.

4. The method of claim 1, further comprising:

determining that a charge level of an energy storage of an elevator car is below a first threshold level;

determining that the received elevator call is associated with a landing floor having a charging arrangement to charge energy storages of elevator cars; and allocating the elevator call to the elevator car having the charge level below the first threshold level to enable charging of the elevator storage at the landing floor.

5. The method of claim 1, further comprising:

determining that the cell imbalance of an energy storage of an elevator car exceeds a third threshold value;

taking the elevator car out of service; and controlling the elevator car to travel to a landing floor having a charging arrangement to balance the energy storage of the elevator car.

6. A computer program comprising program code, which when executed by at least one processor, causes the at least one processor to perform the method of claim 1.

7. A computer readable non-transitory medium comprising program code, which when executed by at least one processor, causes the at least one processor to perform the method of claim 1.

8. An elevator group controller comprising:

means for receiving charge information associated with an energy storage of an elevator car from each of a plurality of elevator cars of the elevator system;

means for receiving an elevator call to a floor providing a charging arrangement for the energy storages; and means for allocating the elevator call to an elevator car of the plurality of elevator cars at least partly based on the charge information received from each of the plurality of elevator cars, wherein the charge information comprises at least one of a charge level and a cell imbalance of the energy storage of each of the elevator cars, wherein the elevator group controller further comprises:

means for determining that the charge level of an energy storage of an elevator car is below a second threshold level;

means for taking the elevator car out of service; and means for controlling the elevator car to travel to a landing floor having a charging arrangement to charge the energy storage of the elevator car.

9. The elevator group controller of claim 8, wherein the charge information comprises a request to charge the energy storage.

10. The elevator group controller of claim 8, wherein the charge information comprises a request to perform cell balancing of the energy storage.

11. The elevator group controller of claim 8, further comprising:

means for determining that the cell imbalance of an energy storage of an elevator car exceeds a third threshold value;

means for taking the elevator car out of service; and controlling the elevator car to travel to a landing floor having a charging arrangement to balance the energy storage of the elevator car.

12. An elevator system comprising an elevator group controller of claim 8.

13. The elevator system of claim 12, comprising at least two elevator shafts, each of the at least two elevator shafts comprising a plurality of landings and at least one charging arrangement to charge the energy storages of elevator cars, wherein the charging arrangements of different elevator shafts are disposed at different floor levels.

14. An elevator group controller comprising:

means for receiving charge information associated with an energy storage of an elevator car from each of a plurality of elevator cars of the elevator system;

means for receiving an elevator call to a floor providing a charging arrangement for the energy storages; and means for allocating the elevator call to an elevator car of the plurality of elevator cars at least partly based on the charge information received from each of the plurality of elevator cars, wherein the elevator group controller further comprises:

means for determining that a charge level of an energy storage of an elevator car is below a first threshold level;

means for determining that the received elevator call is associated with a landing floor having a charging arrangement to charge energy storages of elevator cars;

means for allocating the elevator call to the elevator car having the charge level below the threshold level to enable charging of the elevator storage at the landing floor;

means for determining that the cell imbalance of an energy storage of an elevator car exceeds a third threshold value;

means for taking the elevator car out of service; and means for controlling the elevator car to travel to a landing floor having a charging arrangement to balance the energy storage of the elevator car.

* * * * *